Patented Oct. 31, 1939

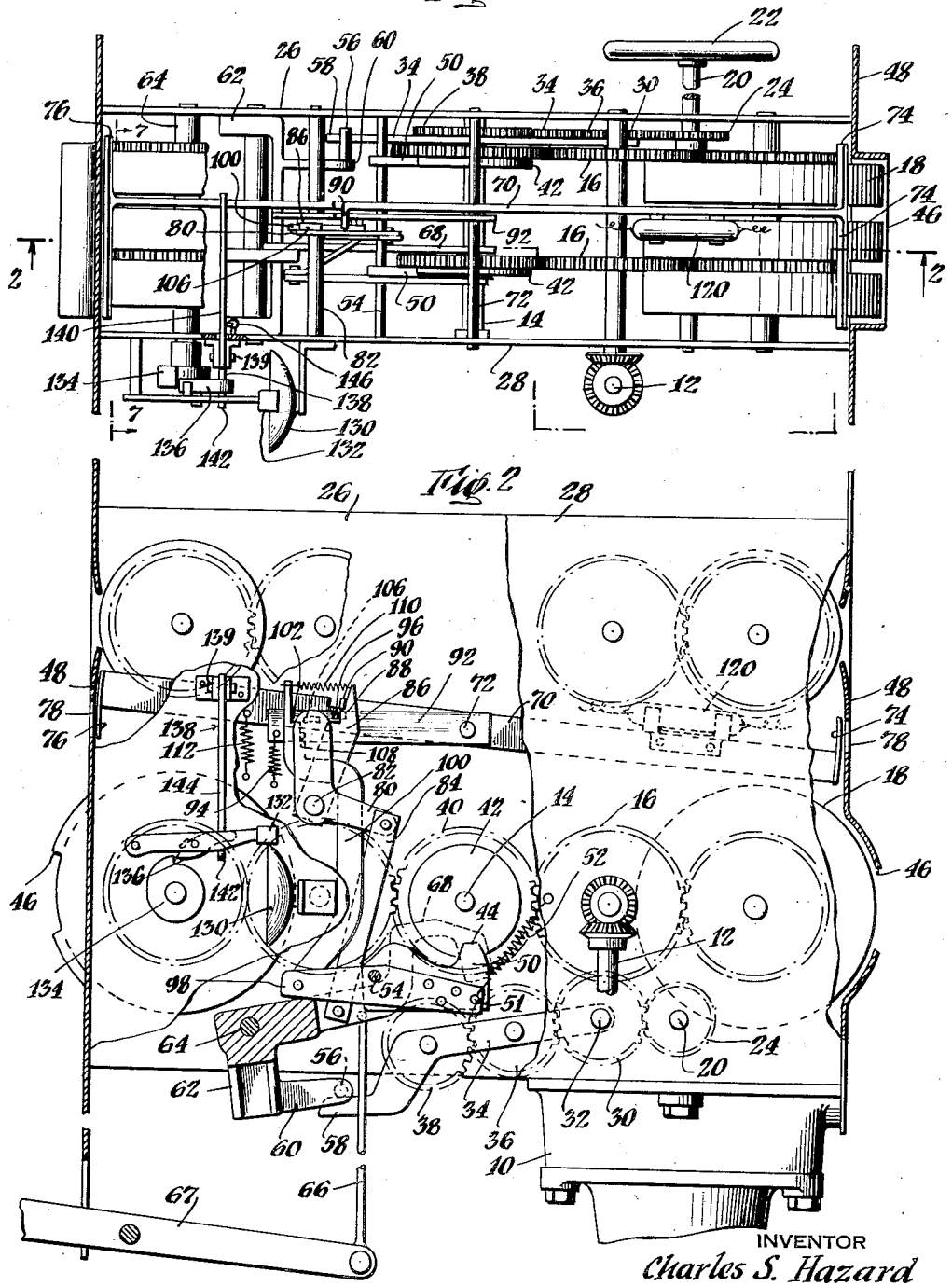

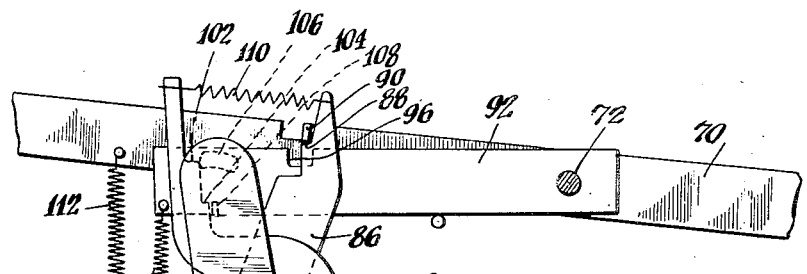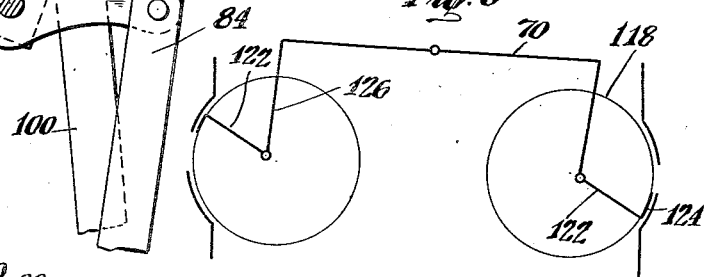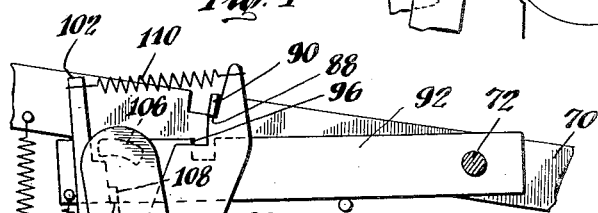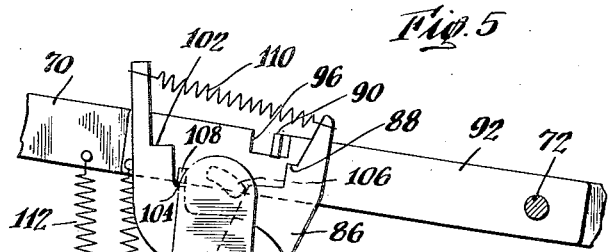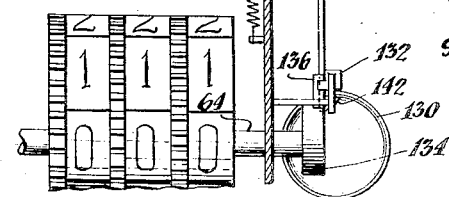

2,178,230

UNITED STATES PATENT OFFICE 2,178,230

SIGNAL DEVICE FOR DISPENSING PUMPS

Charles S. Hazard, Andover, N. J., assignor to Neptune Meter Company, a corporation of New Jersey Application August 10, 1938, Serial No. 224,062

10 Claims. (Cl. 221—95)

This invention relates to improvements in dispensing pumps or the like embodying a signal for disclosing whether an indicator has been zeroized prior to a dispensing operation, and particularly to improvements in devices of the type disclosed in my Patent No. 2,061,538, patented November 17, 1936, and my co-pending application, Serial No. 97,133, filed August 21, 1936.

An object of my invention is to provide a construction readily applicable to many different types of dispensing pump registers or indicators without extensive modification of the elements thereof, and capable of giving visible and/or audible warning when the indicators have not been zeroized prior to a dispensing operation.

A further object of the invention is to provide actuating means for the signalling device having only a few parts which are of rugged construction and readily manufactured, and are positive in their actuation of the signalling device.

A still further object of the invention is to provide a warning device which does not require the provision of complicated mechanisms for zeroizing the registers on the dispensing pump and for actuation of the warning signal.

The objects of the invention may be achieved in any of various ways and by the use of various types of mechanisms. For example, construction embodying the present invention may include a signal actuating member or arm adapted to be retained in one position during normal operation of the dispensing mechanism and when the indicator has been fully reset, but which is movable to display or actuate the signal on operation of the dispensing mechanism when the indicator is displaced from its zero position. The signal actuating arm may carry at its ends plates movable to display designations indicating that the indicator has not been reset to zero. The mechanism may also be used to actuate shutters capable of covering and preventing visual registration of the quantity or the cost of the liquid dispensed, or it may actuate means to give an audible signal and, if desired, any two or more such means may be actuated in conjunction to effect the desired result.

In the form of the invention illustrated the position of the signal actuating arm is controlled by a linkage mechanism actuated in response to movement of manually or automatically operated means actuated at the beginning of a dispensing operation, such as, for example, a hose support and/or a switch for controlling a pump motor. However, it will be apparent that the signal actuating arm or other signal actuating means employed may be actuated by any element of the device which is operated upon initiating a dispensing operation or incidental thereto.

For a better understanding of the present invention reference may be had to the accompanying drawings in which:

Figure 1 is a top plan view of a register embodying one form of my novel signal device, parts of the register being broken away to disclose details of the signalling device;

Figure 2 is a view in section taken on line 2—2 of Figure 1;

Figure 3 is a side view of a portion of the actuating mechanism for the signal device shown in Fig. 1 with parts shown in a position assumed at the conclusion of a dispensing operation, but prior to zeroizing of the dispensing pump register.

Figure 4 is a side view of the actuating mechanism shown in Fig. 3, with the parts shown in their operative relationship after a zeroizing operation, but prior to the beginning of a subsequent dispensing operation.

Figure 5 is an additional view of the signal arm actuating mechanism disclosing the relationship of the parts of the actuating mechanism during a dispensing operation when the indicator has previously been returned to zero.

Figure 6 is a diagrammatic view of a construction by which the actuating mechanism is utilized to operate shutters for concealing or preventing visual registration of the volume of liquid dispensed when the register has not previously been zeroized, and Figure 7 is a sectional view, partly broken away, taken on line 7—7 of Fig. 1.

In the form of invention illustrated in Figs. 1 to 5, a motor actuated pump or other supply means (not shown) is utilized to deliver liquid to a meter 10 and through a suitable series of conduits to a dispensing hose nozzle. Passage of liquid through the meter 10 actuates a shaft 12 for driving an indicator such as a numeral wheel or drum type of registering mechanism or other means for indicating visually the volume and/or the cost of liquid dispensed. The indicator or register may suitably consist of a main drive shaft 14 provided with suitable segmental, full and transfer gears for driving idler gears 16 to rotate indicating drums 18 in such a manner that each full revolution of the lowest value or fractions drum will cause $\frac{1}{10}$ of a revolution of the units drum and one complete revolution of the units drum will cause $\frac{1}{10}$ revolution of the tens drum, thereby indicating fractional and full gallons up to 99.9 gallons.

After a dispensing operation has been completed the drums may be returned to their initial or zero position by any suitable or conventional type of reset means. In the construction illustrated I have provided a reset means consisting of a shaft 20 provided with a hand wheel 22 which drives a pinion 24 fastened thereto and disposed between the side plates 26 and 28 of the register. Pinion 24 meshes with an idler gear 30 mounted for rotation on the stud shaft 32 which also movably supports a trolley arm 34 for pivotal movement thereabout. The trolley arm 34 carries two additional idler gears 36 and 38, the latter being adapted to swing upwardly to engage a gear 40 mounted on the main drive shaft 14 and through rotation of crank handle 22 to return all the drums 18 to initial position. Upward movement of the reset trolley arm 34 to move the gear 38 into engagement with the gear 40 on main drive shaft 14 is caused by the resistance of the gears 38, 36 and 32 to rotation.

The main drive shaft 14 also carries a number of disks 42, each of which is associated with a corresponding drum 18 of the register. Each of the disks 42 is provided with a peripheral notch 44 which, when disposed in alignment at the bottom of the disks, cause the drums 18 to be disposed with their zero indicia exposed through the aperture 46 in the casing 48 of the dispensing pump.

The drums are stopped at zero position upon resetting by engagement of a plurality of pawls 50 in the notches 44 in disks 42. The pawls 50 are rigidly interconnected by a plurality of rods 51 and are pivotally movable about a shaft 54 extending between the side plates 26 and 28 of the register and are normally urged toward and into engagement with the disks 42 by means of spring 52.

Downward movement of the reset trolley arm 34 to disengage gears 38 and 40 is caused by engagement of a pin 56 with an extension 58 on the arm 34. The pin 56 is carried by a lever 60 integral with a yoke member 62 oscillatably supported on a shaft 64 mounted in the side plates 26 and 28 of the register. Oscillatory movement of the yoke 62 is produced through a link 66 connected to an element of the device operable on initiation of a dispensing operation or as an incident thereto, such as the motor switch, a suitable movable support for the dispensing hose or other movable means. However, for purposes of illustration, it will be herein assumed that the link 66 is connected to the inner end of a support 67 for a dispensing hose.

When the hose is disposed on the hose support 67, the link 66 is moved upwardly rocking the yoke 62 in a counterclockwise direction, and when the hose is removed from the support the yoke 62 is rocked in a clockwise direction, as seen in Fig. 2. The link 66 may be suitably connected to the yoke through a goose neck lever 68 which straddles certain of the rods 51 connecting the pawls 50, the lever 68 being adapted to engage one of the rods for moving the pawls 50 out of the notches in the disks 42 when the hose is removed from the support.

Movement of the yoke member 62 and the zero stop pawls 50 is utilized to control operation of a signal actuating arm 70 pivotally mounted on a shaft 72, mounted in the side plates 26 and 28 of the register. As disclosed in Figure 2, the signal actuating arm 70 may carry at its opposite ends signal plates 74 and 76 provided with suitable indicia or warning means for indicating that the register has not been reset to zero. The lower portion of the plate 74 and the upper portion of the plate 76, which are normally concealed by the casing 48, as shown in Fig. 2, carry such warning means. If desired, the upper portion of the plate 74 and the lower portion of plate 76 may also carry designations or means for advising the customer that the mechanism has been fully reset. The signal actuating arm when operated thereby serves to display or actuate the warning signal. The incompletely reset condition of the register at the beginning of a dispensing operation thus may be indicated by exposing the appropriate half of the signal plates 74 and 76 through apertures 78 in the casing 48 of the dispensing pump. If the register is in its normal operating condition, that is to say, after the indicator has been fully reset and the dispensing device is either in operation or at rest, or after a normal dispensing operation has been completed with the hose returned to its support, an indication of proper resetting of the register may be displayed by signal plates 74 and 76. Should the hose be removed from its support before the register has been reset, the signal plates 74 and 76 would then be actuated to expose the indication that the register is in an incomplete reset condition.

Movement of the signal arm 70 is controlled by suitable actuating means which, as shown, include a linkage mechanism comprising a bell crank lever 80 pivotally mounted on a shaft 82 extending between the side plates 26 and 28 of the register. The lower arm of bell crank 80 is connected to goose neck lever 68 by means of a link 84 and moves in the same direction as the goose neck on oscillation thereof. Also pivotally mounted on the shaft 82 is a latch lever 86 provided with a latch step 88 for receiving at certain times a projection 90 on the signal actuating arm 70. Associated with the signal actuating arm 70 is an auxiliary lever 92 pivotally mounted on the shaft 72 and normally urged in a counterclockwise direction by means of a spring 94. The auxiliary lever 92 is provided with a notch 96 in its upper edge for receiving the projection 90 on the signal actuating arm 70 at certain times during actuation of the signal arm. The zero stop pawls 50 are also provided with the extension 98 carrying a substantially S-shaped lever 100 at its upper end two steps or notches 102 and 104 for cooperating with a lug 106 on the bell crank 80 and a projection 108 on the auxiliary lever 92, respectively. The lever 100 is not only movable up and down with the extension 98 on the pawls 50, but is also pivotally movable with respect thereto in either a clockwise or counterclockwise direction, as seen in Figures 2 to 5 of the drawings. Latch lever 86 and S-shaped lever 100 are normally urged toward each other by means of a spring 110.

The operation of the signal device is as follows:

When a dispensing operation is terminated the link 66 is moved upwardly by the return of the hose to support 67. Link 66, however, may be otherwise actuated on completion of a dispensing operation such as by opening the motor switch or other movable means. The upward movement of link 66 moves goose neck arm 68 and yoke 62 in a counterclockwise or upward direction. At the same time link 84 rocks the bell crank 80 in a counterclockwise direction placing the various parts in the position shown in Figure 3 with the lug 106 bearing against a portion of the S-shaped arm 100 and with the projection 108 on the auxiliary arm bearing against another portion of the S-shaped arm 100 adjacent the step 104. The projection 90 on signal actuating arm 70 rests on the step 88 of latch lever 86. At the same time the zero stop pawls 50 bear against the periphery of the zero stop disk 42 at a point spaced from the zero stop notches 44. For this reason the S-shaped lever 100 is lifted slightly into a position whereby the step 104 cannot engage the projection 108 on the auxiliary arm 92.

If the hose is removed from the support with the signal actuating mechanism in this condition, the link 66 will pull the goose-neck lever 68 and the bell crank 80 in a clockwise direction moving lug 106 into engagement with the latch lever 86 whereby the lever 86 is also moved clockwise releasing the projection 90 on signal arm 70 from the step 88. Spring 112 then acts to rock the signal actuating arm 70 in a counterclockwise direction, thus exposing the warning signal on the lower half of signal plate 74 and the upper half of signal plate 76 through the apertures 78, thereby indicating that the register has not been reset to zero.

Assuming, however, that the device is in the condition disclosed in Figure 3, that is, a dispensing operation concluded and that the register carries an indication of the previous dispensing operation, if the register is zeroized by rotating crank 22, the disks 42 are rotated to such a position that the notches 44 will be disposed in alignment in position to receive zero stop pawls 50, which will be urged by the spring 52 into the notches thereby turning in a counterclockwise direction and pulling the S-shaped lever 100 downward into the position disclosed in Figure 4, wherein the lower step 104 can receive the projection 108 on the auxiliary arm 92. The S-shaped lever then is moved clockwise into the position shown in by means of the spring 110 in which the step 104 is beneath projection 108. If a dispensing operation is then begun, downward movement of the goose neck lever 68 with the hose support or the motor switch will then move the pawls 50 out of the notches in disks 42 moving the S-shaped lever 100 upwardly and the auxiliary lever 92 into alignment with the signal arm 70. Downward movement of the goose-neck lever 68 also rocks bell crank lever 80 causing the lug 106 to trip latch lever 86. Under these circumstances the signal actuating arm 70, however, does not rotate in a counterclockwise direction because of engagement of the projection 90 on signal actuating arm 70 with the auxiliary lever 92, thus retaining the signal actuating arm in its normal position with the upper half of the signal plate 74 and the lower half of the signal plate 76 exposed through the aperture 78 indicating on inspection that the register was zeroized prior to the dispensing operation.

At the conclusion of this dispensing operation and upon upward movement of link 66, the bell crank 80 will again be rotated in a counterclockwise direction allowing the latch lever 86 to move into a position whereby the step 88 will be disposed beneath projection 90 on signal arm 70. The upward movement of link 66 will also raise goose-neck lever 68 and permit pawls 50 to bear against the peripheral edges of disks 42, thereby lowering S-shaped arm 100 slightly from the position shown in Figure 5. The lug 106 on the bell crank 80 will then trip the S-shaped lever 100 releasing the projection 108 from engagement with step 104 on this lever and returning the whole mechanism to the condition disclosed in Figure 3.

It will be apparent that any suitable type of signalling device other than plates 74 and 76, or in conjunction therewith, may be employed. As illustrated in Figure 2, the signal actuating arm 70 may be provided with a mercury switch 120 which may be connected through suitable leads to an alarm bell and a source of current supply whereby, when arm 70 is in a position corresponding to that in which the register has been zeroized prior to a dispensing operation the circuit through the switch will be open. When the signal actuating arm is rocked counterclockwise through failure to zeroize the register, the switch will be tilted and the mercury will complete a circuit and cause an alarm bell to ring. It will be understood, of course, that the alarm bell may be used independently of, or in conjunction with the signal plates as may be desired.

Additionally, if desired, the signal actuating arm 70 may be connected with shutters for concealing the drums 18 on the register if the register has not been reset to zero. A suitable construction of this type is disclosed diagrammatically in Figure 6 and consists of arms 122 pivotally mounted on the shafts supporting the register drums 18 and carrying at their outer ends curved shutter plates 124 capable of substantially or completely covering the apertures 46, or other apertures in the housing 48 of the dispensing pump through which volume or cost indicators, or both, are visible. The levers 122 may be connected by links 126 to signal actuating arm 70 so that upon rocking of the signal actuating arm the shutters will move into and out of position concealing the register drums.

A mechanically operated, audible signal of the type which normally is sounded as each gallon of liquid is dispensed also may be controlled by the signal arm and may be used in conjunction with the above described warning devices or separately, as desired. Such a device is illustrated in Figures 1, 2 and 7 and may utilize the bell 130 and clapper 132 pivotally mounted on the plate 28 and movable away from striking position by a cam 134 driven with the fractional units drum of the register. The cam 134 is provided with a substantially radially arranged drop which releases the clapper 132 and allows it to strike the bell 130. The clapper 132 is preferably provided with a pivotally mounted pawl 136 which engages the cam 134, but allows the cam to be rotated in the reverse direction with the indicator during resetting.

I have illustrated a construction for controlling the clapper 132 to prevent ringing of the bell when the indicator has not previously been zeroized, thus warning the customer of improper manipulation of the pump. This construction consists of a bell crank lever 138 pivotally mounted at 139 on side plates 28 and having one arm 140 overlying signal actuating arm 70 and a hook 142 on the end of the other arm 144 adapted to engage beneath and hold the clapper 132 out of engagement with the bell 130 when the signal actuating arm 70 is rocked counterclockwise by failure to reset the indicator to zero. A spring 146 is connected to the arm 140 normally urging the bell crank 138 to clapper lifting position. When the indicator has been zeroized, the signal actuating arm 70 is positioned to hold the hooked end 142 of the bell crank lever out of the path of movement of the clapper 132, allowing the latter to operate normally to strike the bell at the conclusion of the dispensing of each gallon.

All of the elements making up my improved actuating mechanism for signal devices may be readily manufactured by stamping or otherwise forming the same, thus avoiding the use of complicated gearing mechanism, pawls or ratchets and other control means and may be used with comparatively few alterations with conventional numeral wheel registers or other types of registers consisting of either drums, hands or dials. Each type of device disclosed is simple and positive in its operation and has the advantage that so long as the dispensing pump is properly operated, that is, by zeroizing in each case prior to a subsequent dispensing operation, the position of the signal actuating arm 70 remains unchanged, thereby allowing the use of a simple mercury type of switch or other gravity actuated means for controlling the operation of any suitable signalling device.

It should be understood, however, that the above described actuating mechanism can take other forms than those disclosed in the drawings, and suitable modifications can be made without departing from the invention. Therefore, the forms disclosed should be considered illustrative only and not as limiting the scope of the claims.

I claim:

1. In a dispensing device having an indicator, means for resetting the indicator and means for stopping the indicator at zero; the combination of a movable signal actuating arm, a latch normally retaining the signal actuating arm in one position, means urging the arm toward another position, signal means controlled by the position of the arm, means for tripping the latch at the beginning of a dispensing operation, and means actuated by the indicator stopping means for retaining the signal in the first position when the indicator has been reset to zero and allowing the signal to move to the other position when the indicator has not been reset to zero.

2. In a liquid dispensing device having a meter actuated indicator, means for resetting the indicator, means for stopping the indicator at zero and means for controlling flow of liquid to the meter; the combination of a signal actuating arm, a latch normally retaining the signal actuating arm in one position when the indicator has been reset to zero, means actuated by the flow control means for moving the latch to release the signal actuating arm for movement to another position, auxiliary means controlling movement of said signal actuating arm and means actuated by the zero stop means for controlling the auxiliary means to retain the signal actuating arm in the first position when the indicator has been reset, and for allowing the signal actuating arm to move to the other position when the indicator has not been reset.

3. In a dispensing device having an indicator and means for resetting the indicator to zero; the combination of a movable signal actuating arm, means normally retaining the signal actuating arm in the first position, means urging the arm toward a second position, signal means controlled by the position of the signal actuating arm, means actuated in response to initiation of a dispensing operation for releasing the retaining means, auxiliary means movable into and out of engagement with the signal actuating arm to limit movement of the signal actuating arm, and means responsive to the operation of the resetting means for controlling movement of the auxiliary means to retain the signal actuating arm in the first position when the indicator has been reset to zero, and to release the signal actuating arm for movement to the second position when the indicator has not been reset to zero.

4. In liquid dispensing devices having an indicator, means for resetting the indicator to zero and means movable to stop the indicator at zero; the combination of a movable signal actuating arm, means normally retaining the signal actuating arm in a first position, means urging the arm to a second position, means responsive to initiation of a dispensing operation for moving the retaining means to release the signal actuating arm, a movable auxiliary member, engageable means on said arm and said member, means normally retaining the auxiliary member in a position corresponding to the second position of the signal actuating arm and means operatively connected with the zero stop means for moving the auxiliary member into engagement with the signal actuating arm to retain the latter in the first position when the indicator has been reset to zero and to allow the signal actuating arm to be moved into engagement with the auxiliary member in the second position when the indicator has not been reset to zero.

5. In dispensing devices having an indicator, means for resetting the indicator to zero and means movable to stop the indicator at zero; the combination of a movable signal actuating arm, means for normally retaining the arm in a first position, means urging the arm to a second position, signal means controlled by the position of the arm, an auxiliary arm normally urged to a position corresponding to the second position of the signal actuating arm, engageable means on said signal actuating arm and the auxiliary arm, means actuated by the zero stop means for moving the auxiliary arm to engage the signal actuating arm in the first position when the indicator has been reset to zero, and means actuated in response to initiation of a dispensing operation to release the retaining means.

6. In a dispensing device having an indicator and means for resetting the indicator to zero; the combination of a movable signal actuating arm, means normally retaining the arm in a first position, means for urging the arm to a second position, and auxiliary means responsive to operation of said resetting means to restrain the signal actuating arm against movement to the second position, and means for moving the retaining means to release the signal actuating arm upon initiation of a dispensing operation.

7. In a dispensing device having an indicator, means for resetting the indicator to zero and means movable to stop the indicator at zero; the combination of a pivoted signal actuating arm, a pivoted auxiliary arm engageable with the signal actuating arm to limit movement of the signal actuating arm, means normally retaining the signal actuating arm in a first position, means urging the signal actuating arm to a second position, means urging the auxiliary arm to the second position, means operatively connected with the zero stop means actuated by movement of the zero stop means to engage the auxiliary arm and upon resetting of the indicator to zero to lift the auxiliary arm to hold the signal actuating arm in the first position, and means actuated in response to the initiation of a dispensing operation to move the retaining means and release the signal actuating arm.

8. In a dispensing device having an indicator, means for resetting the indicator to zero and means movable to stop the indicator at zero; the combination of a pivoted signal actuating arm, a pivoted auxiliary arm engageable for limiting movement of the signal actuating arm, means normally retaining the signal actuating arm in first position, means urging the signal actuating arm and the auxiliary arm to second position, means connected to the zero stop means operative to engage the auxiliary arm when the indicator has been reset to zero and to move the auxiliary arm to hold the signal arm in the first position during a subsequent dispensing operation and means actuated in response to initiation of a dispensing operation for moving the retaining means for the signal actuating arm to release the signal actuating arm for movement to the second position when the indicator is not reset to zero.

9. In a dispensing device having an indicator, means for resetting the indicator and means movable to stop the indicator at zero; the combination of pivoted signal actuating arm, a pivoted auxiliary arm, means on said arms engageable to limit movement of the signal actuating arm, a latch normally retaining the signal actuating arm in a first position, means urging the actuating and auxiliary arms to a second position, a latch lever connected to the zero stop means and movable to engage the auxiliary arm only when the zero stop means has been moved by resetting of the indicator to zero and thereafter movable to shift the auxiliary arm to the first position on displacement of the zero stop means and means actuated in response to initiation of a dispensing operation for moving the latch to release the signal actuating arm and to release the auxiliary arm from the latch lever at the conclusion of a dispensing operation.

10. In a dispensing device having an indicator, means for resetting the indicator and zero stop means movable into engagement when the indicator is at zero; the combination of a pivoted signal arm, signalling means actuated by said arm, an auxiliary arm pivotally mounted co-axially of and adjacent said signal arm, co-operating means on the auxiliary and signal arms engageable when the arms are in alignment, a latch normally retaining the signal arm in a first position, means urging the signal and auxiliary arms to a second position in which the signalling means is actuated to give a warning, a latch member connected to and actuated by the zero stop means for engaging and moving the auxiliary arm to the first position for holding the signal arm at said first position during a dispensing operation subsequent to resetting the indicator to zero and means movable upon initiation of a dispensing operation for moving the latch to release the signal arm whereby the signal arm will be urged into engagement with the auxiliary arm in the first position if the indicator has been reset to zero and the second position if the indicator has not been reset to zero.

CHARLES S. HAZARD.